US009620850B2

(12) United States Patent
Su et al.

(10) Patent No.: US 9,620,850 B2
(45) Date of Patent: Apr. 11, 2017

(54) WIRELESS COMMUNICATION DEVICE

(71) Applicant: Chiun Mai Communication Systems, Inc., New Taipei (TW)

(72) Inventors: Wei-Cheng Su, New Taipei (TW); Yen-Hui Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/573,938

(22) Filed: Dec. 17, 2014

(65) Prior Publication Data

US 2016/0094695 A1 Mar. 31, 2016

(30) Foreign Application Priority Data

Sep. 30, 2014 (CN) .......................... 2014 1 0517885

(51) Int. Cl.

| | |
|---|---|
| ***H04M 1/00*** | (2006.01) |
| ***H01Q 1/24*** | (2006.01) |
| ***H01Q 13/10*** | (2006.01) |
| ***H01Q 5/335*** | (2015.01) |

(52) U.S. Cl.

CPC ............. *H01Q 1/243* (2013.01); *H01Q 5/335* (2015.01); *H01Q 13/10* (2013.01)

(58) Field of Classification Search

CPC ...................................................... H01O 13/10

USPC ....................... 455/280, 333, 552.1; 343/702

See application file for complete search history.

(56) References Cited

U.S. PATENT DOCUMENTS

2008/0182540 A1* 7/2008 Rofougaran ........... H01Q 1/241 455/280
2012/0169547 A1* 7/2012 Oh ........................... H01Q 1/44 343/702
2014/0184449 A1* 7/2014 Dong ..................... H01Q 21/30 343/702

* cited by examiner

*Primary Examiner* — Hsin-Chun Liao
(74) *Attorney, Agent, or Firm* — Steven M. Reiss

(57) ABSTRACT

A wireless communication device includes a circuit board, a metal frame, and a slot antenna. The circuit board includes a multiple bandpass filter, a plurality of matching circuits, and a plurality of Radio Frequency (RF) modules. The metal frame surrounds the circuit board. The slot antenna includes a feeding portion, at least one grounding portion, and a radiating portion. The feeding portion and the at least one grounding portion are connected between the circuit board and the metal frame, the radiating portion and the circuit board enclose a slot. The radiating portion is formed on a portion of the metal frame. The slot antenna, the multiple bandpass filter, the plurality of matching circuits, and the plurality of RF modules are electrically connected in that order.

20 Claims, 7 Drawing Sheets

200

WIRELESS COMMUNICATION DEVICE

FIELD

The subject matter herein generally relates to a wireless communication device, and particularly relates to a wireless communication device having a slot antenna.

BACKGROUND

Multiple antennas are widely used in wireless communication devices for transceiving wireless signals at multiple frequency bands. Most slot antennas have complicated structures. This complicated structure makes in difficult to design smaller size to meet a miniaturization trend of the wireless communication devices.

BRIEF DESCRIPTION OF THE DRAWINGS

Implementations of the present technology will now be described, by way of example only, with reference to the attached figures.

DETAILED DESCRIPTION

Figure 1:
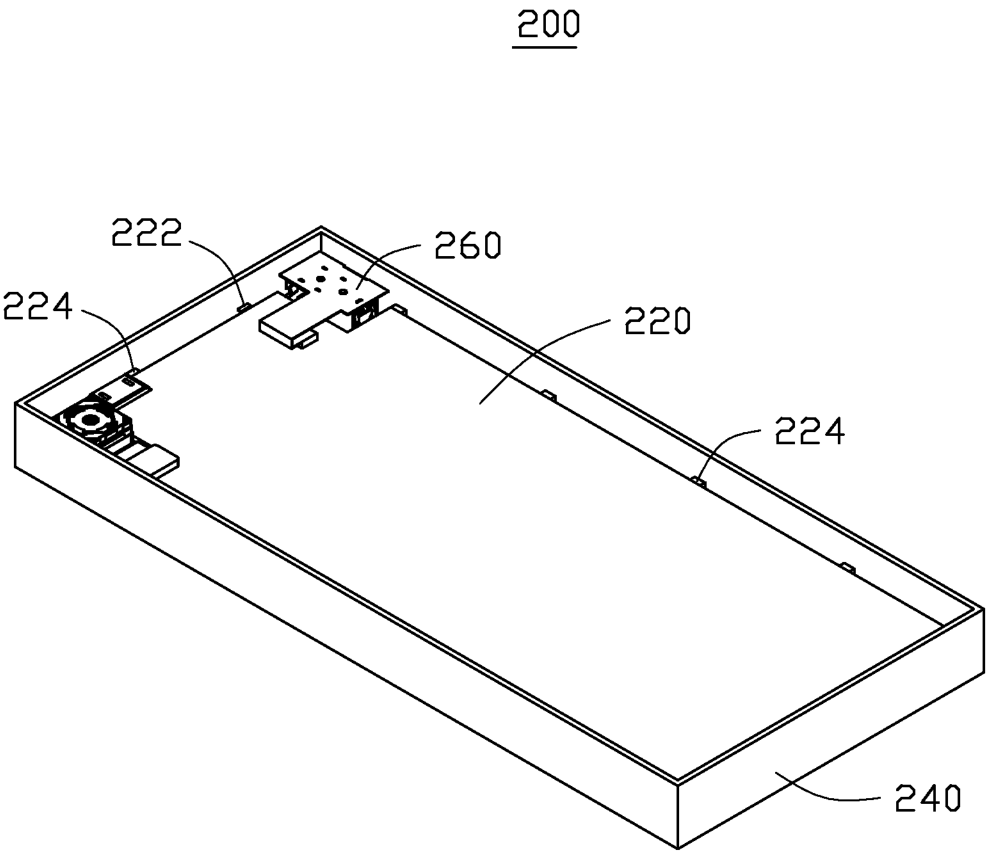
FIG. 1 is an isometric view of an embodiment of a wireless communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Figure 2:
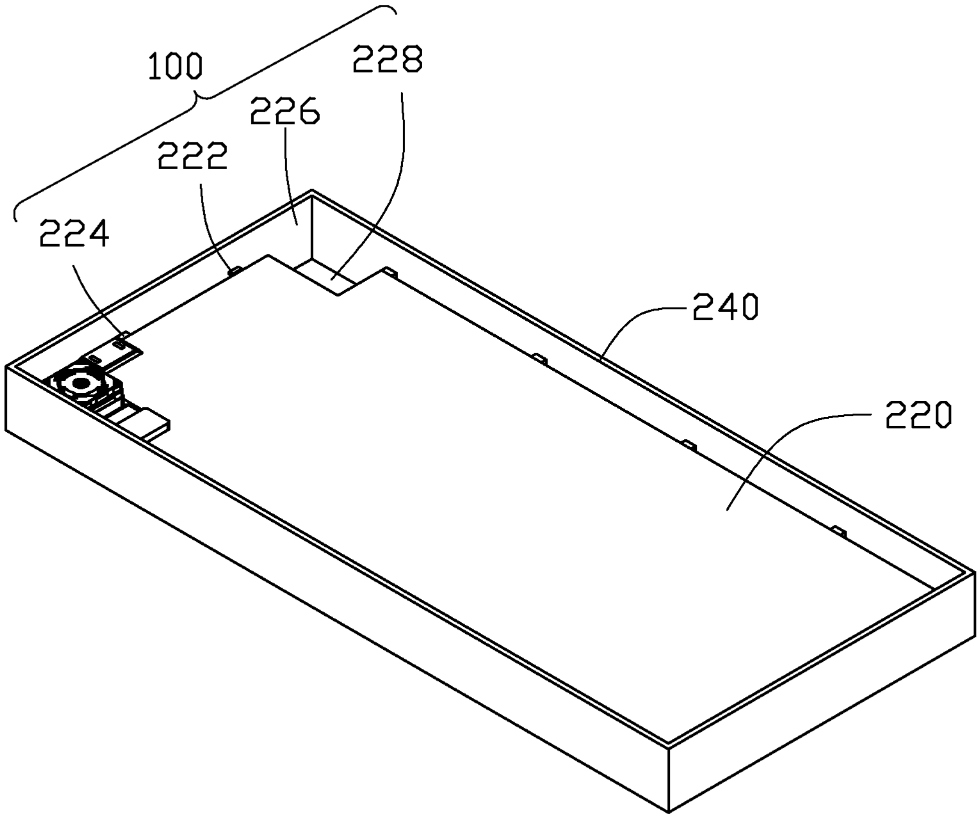
FIG. 2 is a partial isometric view of the wireless communication device of FIG. 1.
Figure 3:
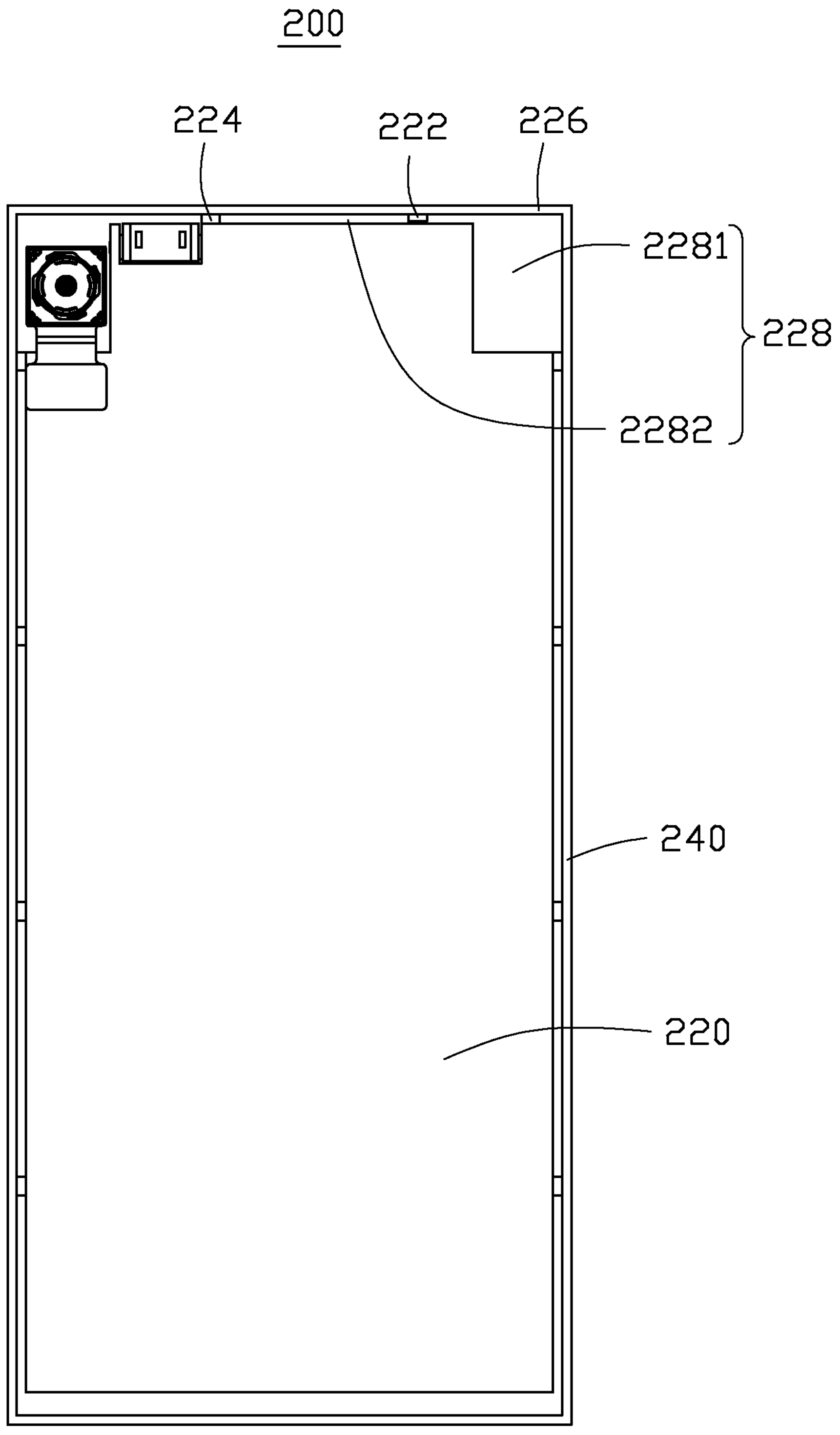
FIG. 3 is a front elevational view of the wireless communication device of FIG. 1.

FIGS. 1, 2, and 3 illustrate at least one embodiment of a wireless communication device 200. The wireless communication device 200 can be a mobile phone, a tablet computer, or a PDA. The wireless communication device 200 includes a slot antenna 100, a circuit board 220, and a metal frame 240. In at least one embodiment, the wireless communication device 200 is a mobile phone having a headphone connector 260.

The slot antenna 100 includes a feeding portion 222, a plurality of grounding portions 224, and a radiating portion 226. The feeding portion 222 and the grounding portions 224 are connected between the circuit board 220 and the metal frame 240. The feeding portion 222 is configured for feeding wireless signals. The grounding portions 224 are configured for grounding. The radiating portion 226 is a part of the metal frame 240 and is configured for radiating wireless signals. The radiating portion 226 and the circuit board 220 enclose a slot 228. In at least one embodiment, the metal frame 240 is in rectangular shape, the circuit board 220 is surrounded by the metal frame 240 and is connected to the metal frame 240 via nine grounding portions 224 and one feeding portion 222. Four grounding portions 224 are arranged on the metal frame 240 on each longer edge and one grounding portion 224 and one feeding portion 222 are arranged on one of shorter edges. The slot 228 includes a first slot section 2281 and a second slot section 2282, the first slot section 2281 and the second slot section 2282 are separated by the feeding portion 222. The first slot section 2281 is used for receiving the headphone connector 260. In at least one embodiment, the headphone connector 260 is processed with electromagnetic shielding, which to reduce affection to the slot antenna 100. The second slot section 2282 is a space defined between the grounding portion 224 and the first slot section 2281.

In at least one embodiment, the slot 228 is defined on the circuit board 220.

In at least one embodiment, a size of the slot 228 can be adjusted to meet different standards, when increasing a width of the slot 228, a frequency width and radiating efficiency can be increased; when increasing a length of the slot 228, the frequency width can be decreased.

Figure 4:
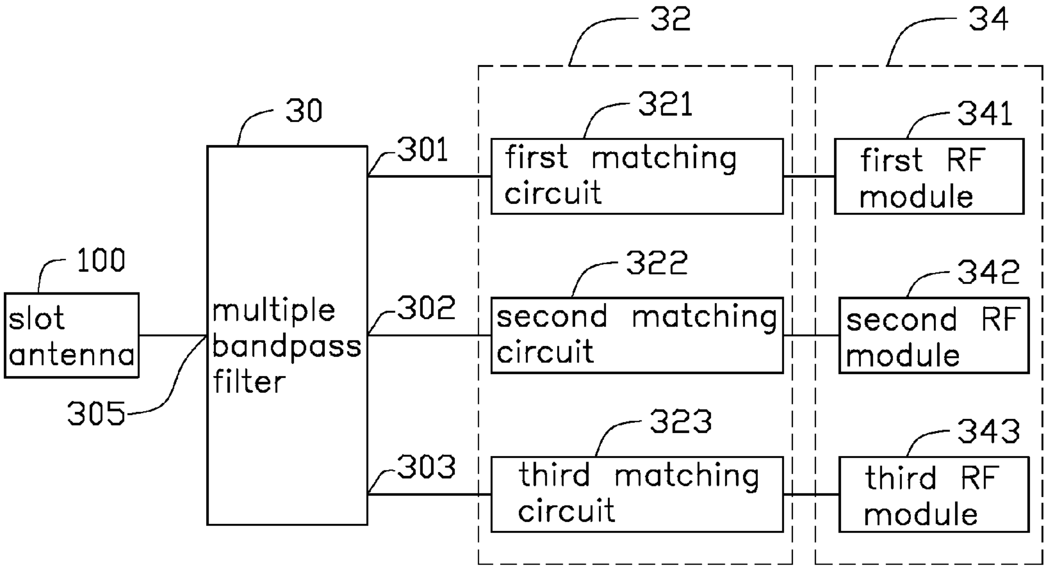
FIG. 4 is a block diagram of the wireless communication device of FIG. 1.

FIG. 4 illustrates that the circuit board 220 includes a multiple bandpass filter 30, a plurality of matching circuits 32, and a plurality of Radio Frequency (RF) modules 34. The slot antenna 100, the multiple bandpass filter 30, the plurality of matching circuits 32, and the plurality of RF modules 34 are electrically connected in that order. The slot antenna 100 receives wireless signals and transmits to the multiple bandpass filter 30 via the feeding portion 222; the wireless signals pass the matching circuit 32 and further reach to the RF modules 34. The multiple bandpass filter 30 is configured for passing wireless signals in particular frequency ranges and meanwhile blocking wireless signals in other frequency ranges. The multiple bandpass filter 30 includes an input terminal 305, a first output terminal 301, a second output terminal 302, and a third output terminal 303. The input terminal 305 is electrically connected to the feeding portion 222. The matching circuits 32 are configured for obtaining a better impedance matching. The matching circuits 32 include a first matching circuit 321, a second matching circuit 322, and a third matching circuit 323. The RF modules 34 include a first RF module 341, a second RF module 342, and a third RF module 343. The first output terminal 301 is electrically connected to the first RF module 341 via the first matching circuit 321; the second output terminal 302 is electrically connected to the second RF module 342 via the second matching circuit 322; the third output terminal 303 is electrically connected to the third RF module 343 via the third matching circuit 323. In at least one embodiment, the first RF module 341 is configured for processing low frequency wireless signals, GPS signals for example; the second RF module 342 is configured for processing middle frequency wireless signals, WIFI 2.4 GHz signals for example; the third RF module 342 is configured for processing high frequency wireless signals, WIFI 5.0 GHz signals for example.

When the wireless communication device 200 receives wireless signals, the slot antenna 100 resonates with the wireless signals and thereby generating an induced current accordingly. The induced current is transmitted to the input terminal 305 of the multiple bandpass filter 30 via the feeding portion 222. The multiple bandpass filter 30 selectively outputs the wireless signals via one of the first output terminal 301, the second output terminal 302, or the third output terminal 303 according to a frequency of the wireless signals, thereby the wireless signals with different frequencies are transmitted to the corresponding first RF module 341, the second RF module 342, or the third RF module 343. When the wireless communication device 200 transmits wireless signals, the first RF module 341, the second RF module 342, and the third RF module 343 transmit signals with different frequencies, and further transmit the signals to the slot antenna 100 via the corresponding matching circuits 32 and the multiple bandpass filter 30, and the slot antenna 100 radiates the signals. Therefore, the wireless communication device 200 can transmit and receive wireless signals at multiple frequency bands.

Figure 5:
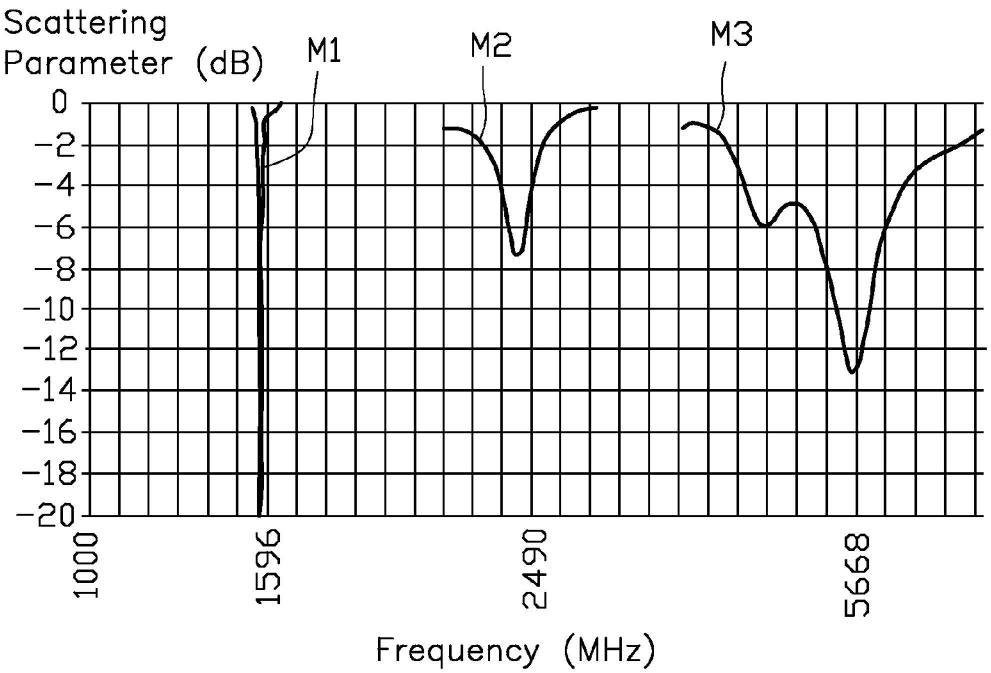
FIG. 5 is a scattering parameter diagram of a slot antenna of the wireless communication device of FIG. 1.

FIG. 5 illustrates a scattering parameter diagram of a slot antenna 100 of the wireless communication device 200, lines M1, M2, and M3 denote different scatting parameter curves of the slot antenna 100 in different frequencies. From the line M1, the slot antenna 100 has a better performance at a frequency of 1575 MHz. From the line M2, the slot antenna 100 has a better performance at a frequency of 2.4 GHz. From the line M3, the slot antenna 100 has a better performance at a frequency of 5 GHz. Therefore, the wireless communication device 200 can transmit and receive wireless signals at multiple frequency bands, such as GPS and WIFI frequency band.

Figure 6:
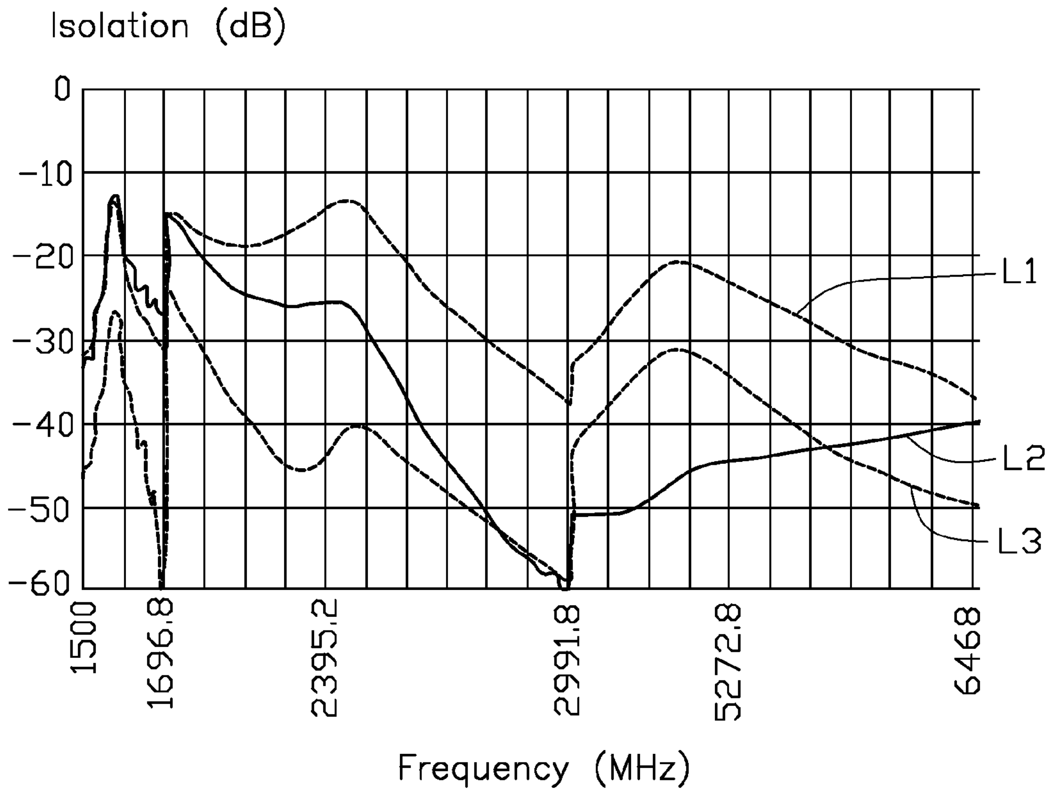
FIG. 6 is an isolation diagram of the slot antenna of the wireless communication device of FIG. 1.

FIG. 6 illustrates an isolation diagram of the slot antenna 100 of the wireless communication device 200, lines L1, L2, and L3 denote different isolation curves of the slot antenna 100 in different frequencies. From the lines L2 and L3, when the slot antenna 100 in a frequency of about 1575 MHz, isolations of the 1575 MHz signals corresponding to the WIFI 2.4 GHz signals and the WIFI 5.0 GHz signals are both about −13 dB. From the line L1, when the slot antenna 100 in a frequency of about 2.4 GHz, an isolation of the 2.4 GHz signals corresponding to the WIFI 5.0 GHz signals is about −13 dB; when the slot antenna 100 in a frequency of about 5.0 GHz, an isolation of the 2.4 GHz signals corresponding to the WIFI 5.0 GHz signals is less than −20 dB.

Figure 7:
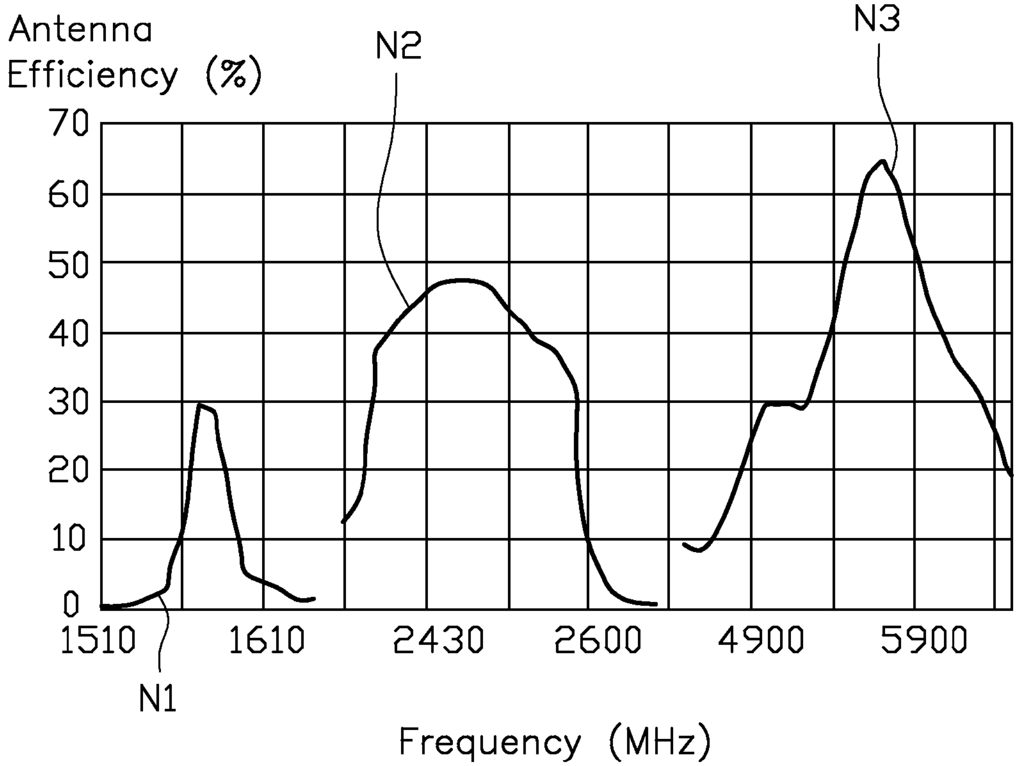
FIG. 7 is an antenna efficiency diagram of the slot antenna of the wireless communication device of FIG. 1.

FIG. 7 illustrates an antenna efficiency diagram of the slot antenna 100 of the wireless communication device 200, lines N1, N2, and N3 denote different antenna efficiency curves of the slot antenna 100 in different frequencies. From the line N1, an antenna efficiency of the slot antenna 100 transmitting and receiving wireless signals in a frequency of about 1575 MHz is about 30%. From the line N2, an antenna efficiency of the slot antenna 100 transmitting and receiving wireless signals in a frequency of about 2.4 GHz is about 42%. From the line N3, an antenna efficiency of the slot antenna 100 transmitting and receiving wireless signals in a frequency of about 5 GHz is about 42%.

The wireless communication device 200 includes the slot antenna 100 and the multiple bandpass filter 30 that resonates with the slot antenna 100. Therefore, the wireless communication device 200 transmits and receives wireless signals at different frequency bands; meanwhile the decreased size allows employment in a miniaturized wireless communication device 200.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A wireless communication device comprising:

a circuit board, the circuit board comprising a multiple bandpass filter, a plurality of matching circuits, and a plurality of Radio Frequency (RF) modules;

a metal frame surrounding the circuit board; and a slot antenna comprising:

a feeding portion;

a plurality of grounding portions connected between the circuit board and the metal frame, a portion of the grounding portions symmetrically positioned at two opposite sides of the circuit board; and a radiating portion formed on a portion of the metal frame;

wherein the feeding portion and the at least one grounding portion are connected between the circuit board and the metal frame, the radiating portion and the circuit board together form a slot; and wherein the slot antenna, the multiple bandpass filter, the plurality of matching circuits, and the plurality of RF modules are electrically connected to each other;

wherein the multiple bandpass filter comprises an input terminal, a first output terminal, a second output terminal, and a third output terminal;

the plurality of matching circuits comprises a first matching circuit, a second matching circuit, and a third matching circuit;

the plurality of RF modules comprise a first RF module, a second RF module, and a third RF module;

the input terminal of the multiple bandpass filter is electrically connected to the feeding portion;

the first output terminal is electrically connected to the first RF module through the first matching circuit the second output terminal is electrically connected to the second RF module via the second matching circuit the third output terminal is electrically connected to the third RF module via the third matching circuit;

wherein the first RF module, the second RF module, and the third RF module receive the wireless signals from the multiple bandpass filter and transmit signals with different frequencies to the multiple bandpass filter; and wherein the first RF module, the second RF module, and the third RF module further transmit the signals to the slot antenna through the corresponding matching circuits and the multiple bandpass filter, and the slot antenna radiates the signals.

2. The wireless communication device of claim 1, wherein the slot is formed between two of the plurality of grounding portions, and the feeding portion is positioned within the slot.

3. The wireless communication device of claim 1, wherein the slot comprises a first slot section and a second slot section, the first slot section and the second slot section are separated from each other by the feeding portion.

4. The wireless communication device of claim 3, wherein the first slot section receives a headphone connector of the wireless communication device; the second slot section is a space formed between one of grounding portions and the first slot section.

5. The wireless communication device of claim 1, wherein the slot is defined on the circuit board and enclosed by the radiating portion.

6. The wireless communication device of claim 1, wherein the first RF module is configured for processing low frequency wireless signals; the second RF module is configured for processing middle frequency wireless signals; the third RF module is configured for processing high frequency wireless signals.

7. The wireless communication device of claim 6, wherein the slot antenna generates induced current after receiving and transmitting wireless signals and resonating with the wireless signals;

the feeding portion feeds the induced current to the input terminal; the multiple bandpass filter selectively outputs the wireless signals through one of the first output terminal, the second output terminal, or the third output terminal according to a frequency of the wireless signals, wherein the wireless signals with different frequencies are transmitted to corresponding the first RF module, the second RF module, or the third RF module.

8. A wireless communication device comprising:

a circuit board, the circuit board comprising a multiple bandpass filter, a plurality of matching circuits, and a plurality of Radio Frequency (RF) modules;

a metal frame surrounding the circuit board; and a slot antenna comprising:

a feeding portion;

a plurality of grounding portions connected between the circuit board and the metal frame, a portion of the grounding portions symmetrically positioned at two opposite sides of the circuit board; and a radiating portion formed on a portion of the metal frame;

wherein the slot antenna, the multiple bandpass filter, the plurality of matching circuits, and the plurality of RF modules are electrically connected to each other; and wherein the slot antenna receives wireless signals and forwards to the multiple bandpass filter, the multiple bandpass filter selectively outputs the wireless signals to one of the RF modules via the corresponding matching circuit according to different frequencies of the wireless signals;

wherein the multiple bandpass filter comprises an input terminal, a first output terminal, a second output terminal, and a third output terminal;

the plurality of matching circuits comprises a first matching circuit, a second matching circuit, and a third matching circuit;

the plurality of RF modules comprise a first RF module, a second RF module, and a third RF module;

the input terminal of the multiple bandpass filter is electrically connected to the feeding portion; the first output terminal is electrically connected to the first RF module via the first matching circuit the second output terminal is electrically connected to the second RF module via the second matching circuit the third output terminal is electrically connected to the third RF module via the third matching circuit;

wherein the first RF module, the second RF module, and the third RF module receive the wireless signals from the multiple bandpass filter and transmit signals with different frequencies to the multiple bandpass filter; and wherein the first RF module, the second RF module, and the third RF module further transmit the signals to the slot antenna via the corresponding matching circuits and the multiple bandpass filter, and the slot antenna radiates the signals.

9. The wireless communication device of claim 8, wherein the slot is formed between two of the plurality of grounding portions, the feeding portion is positioned within the slot.

10. The wireless communication device of claim 8, wherein the slot comprises a first slot section and a second slot section, the first slot section and the second slot section are separated from each other by the feeding portion.

11. The wireless communication device of claim 10, wherein the first slot section is configured for receiving a headphone connector of the wireless communication device; the second slot section is a space formed between one of the grounding portions and the first slot section.

12. The wireless communication device of claim 8, wherein the slot is defined on the circuit board and enclosed by the radiating portion.

13. The wireless communication device of claim 8, wherein the first RF module is configured for processing low frequency wireless signals; the second RF module is configured for processing middle frequency wireless signals; the third RF module is configured for processing high frequency wireless signals.

14. The wireless communication device of claim 13, wherein the slot antenna generates induced current after receiving and transmitting wireless signals and resonating with the wireless signals;

the feeding portion feeds the induced current to the input terminal; the multiple bandpass filter selectively outputs the wireless signals through one of the first output terminal, the second output terminal, or the third output terminal according to a frequency of the wireless signals, wherein the wireless signals with different frequencies are transmitted to corresponding the first RF module, the second RF module, or the third RF module.

15. A wireless communication device comprising:

a circuit board, the circuit board comprising a multiple bandpass filter, a plurality of matching circuits, and a plurality of Radio Frequency (RF) modules, further comprising a first side and a second side opposite to the first side;

a metal frame surrounding the circuit board; and a slot antenna comprising:

a feeding portion;

a plurality of grounding portions connected between the circuit board and the metal frame, a portion of the grounding portions symmetrically positioned at a first side and a second side opposite to the first side, wherein a number of the grounding portions positioned at the first side is the same as that of the grounding portions positioned at the second side, each of the grounding portions positioned at the first side is corresponding to one of the grounding portions positioned at the second side; and a radiating portion formed on a portion of the metal frame;

wherein the slot antenna, the multiple bandpass filter, the plurality of matching circuits, and the plurality of RF modules are electrically connected to each other; and wherein the slot antenna receives wireless signals and forwards to the multiple bandpass filter, the multiple bandpass filter selectively outputs the wireless signals to one of the RF modules via the corresponding matching circuit according to different frequencies of the wireless signals.

16. The wireless communication device as claimed of claim 15, wherein the slot is formed between two of the plurality of grounding portions, the feeding portion is positioned within the slot.

17. The wireless communication device as claimed of claim 16, wherein the slot comprises a first slot section and a second slot section, the first slot section and the second slot section are separated by the feeding portion, the first slot section is configured for receiving a headphone connector of the wireless communication device; the second slot section is a space formed between one of grounding portion and the first slot section.

18. The wireless communication device as claimed of claim 15, wherein the multiple bandpass filter comprises an input terminal, a first output terminal, a second output terminal, and a third output terminal; the plurality of matching circuits comprise a first matching circuit, a second matching circuit, and a third matching circuit; the plurality of RF modules comprise a first RF module, a second RF module, and a third RF module; the input terminal of the multiple bandpass filter is electrically connected to the feeding portion; the first output terminal is electrically connected to the first RF module via the first matching circuit; the second output terminal is electrically connected to the second RF module via the second matching circuit; the third output terminal is electrically connected to the third RF module via the third matching circuit.

19. The wireless communication device as claimed of claim 18, wherein the slot antenna generates induced current after receiving and transmitting wireless signals and resonating with the wireless signals; the feeding portion feeds the induced current to the input terminal; the multiple bandpass filter selectively outputs the wireless signals via one of the first output terminal, the second output terminal, or the third output terminal according to a frequency of the wireless signals, thereby the wireless signals with different frequencies are transmitted to corresponding the first RF module, the second RF module, or the third RF module.

20. The wireless communication device as claimed of claim 19, wherein the first RF module, the second RF module, and the third RF module receive the wireless signals from the multiple bandpass filter and transmit signals with different frequencies to the multiple bandpass filter, and further receives transmit the signals to the slot antenna via the corresponding matching circuits and the multiple bandpass filter, and the slot antenna radiates the signals.

* * * * *